United States Patent Office.

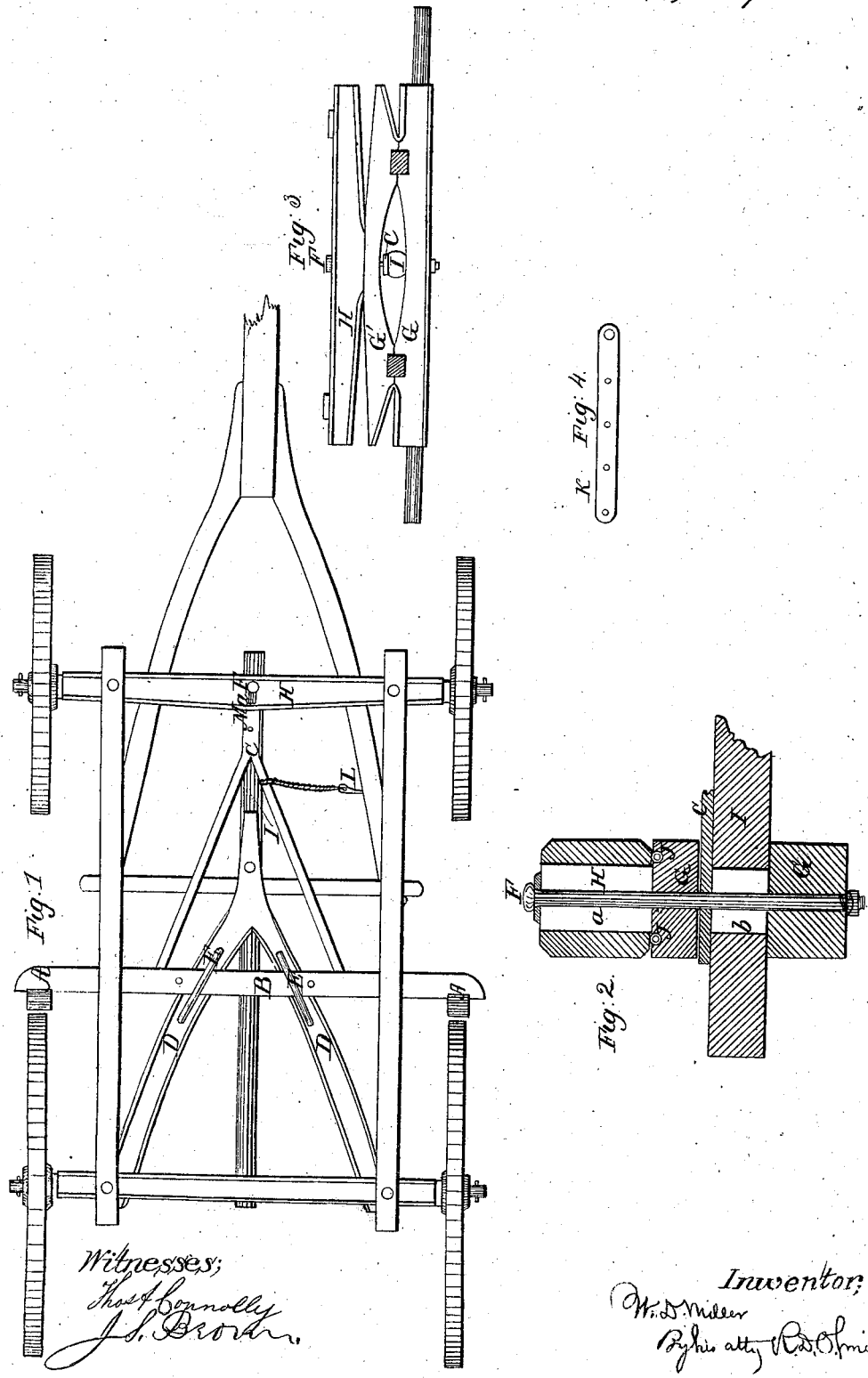

WILLIAM D. MILLER, OF ENON, OHIO.

Letters Patent No. 62,869, dated March 12, 1867.

---

IMPROVEMENT IN AUTOMATIC WAGON-BRAKE.

---

The Schedule referred to in these Letters Patent and making part of the same.

---

TO ALL WHOM IT MAY CONCERN:

Be it known that I, W. D. MILLER, of Enon, in the county of Clark, and State of Ohio, have invented a new and useful Improvement in Automatic Wagon-Brakes; and I do hereby declare the following to be a full, clear, and exact description of the same, reference being had to the accompanying drawings, in which—

Figure 1 is a plan view of a wagon having my improvement attached.

Figure 2 is a vertical longitudinal section through the forward axle and bolster on the line x x of fig. 1.

Figure 3 is an elevation of the front axle.

Figure 4 is the extension-rod.

That others may understand the construction and operation of my invention, I will particularly describe it.

The running gear and framework are not different from those in ordinary use, but the forward axle has a forward and backward motion as the horses draw upon the tongue, or hold back, as in descending a hill, and this forward and backward motion of the axle is communicated to the brakes A, which press against the rear wheels, by means of the bar B and forked connecting-rod C. The bar B rests upon the perch braces D D, to which they are secured by the long staples E E, or some equivalent device, which will not permit the said bar to have any vertical motion whatever, while it may move horizontally back and forth in the direction of the front of the wagon in obedience to the movement of the brake-rod C. In order to permit the axle and brake-rod to move back and forth as described, the front bolster, as well as the end of the perch I, is slotted, as shown in the figures of the drawing. While the king-bolt F passes through the slots a and b in the bolster H and perch I, it passes through close holes in the axle G and the connecting-rod C. The effect of this arrangement is evident. As the horses hold back, or the carriage moves forward faster than they do, the front axle G will be moved backward so as to decrease the distance between it and the rear axle; this occurs because of the slots b and a, which permit this increase or decrease of distance. As the axle moves backward it carries with it the king-bolt F and the connecting-rod C, because the hole in axle G and rod C, through which the bolt F passes, allows said bolt no play room. The backward movement of the connecting-rod C insures a corresponding movement of the bar B and brake shoes A A, and the latter are thereby pressed against the peripheries of the rear wheels. When the wagon bears a load, the friction between the sand-board G' and the bolster H would be very great if the rollers J J were not introduced; they may be set either in the bolster or sand-board, and may occupy such a position as is found advantageous, their object being simply to prevent friction between the bolster and axle, which would neutralize partially or wholly the action of the brakes. It sometimes happens that it is desirable to increase the distance between the front and rear axles, and as this is only done by running the rear axle back upon the perch, the brakes would be rendered inoperative if no means were provided for lengthening the rod C; this is done by means of an extension-bar, K, fig. 3, which may be bolted to the end of C when it is desired to lengthen the wagon as described. The pin L, conveniently suspended by a short chain, is used to fasten the bar C in place, by inserting it through the hole M into a corresponding hole in the perch I when it is desired to back the wagon without bringing the brakes into play.

Having described my invention, what I claim as new, and desire to secure by Letters Patent, is—

1. The axle G and slotted bolster H, in combination with the rollers J, substantially as and for the purpose set forth.

2. The automatic brake A, operated by means of the connecting-rod C and axle G, in combination with the slotted bolster H, slotted perch I, and bolt F, as and for the purpose set forth.

WM. D. MILLER.

Witnesses:
J. WARREN KEIFER,
D. A. HARRISON.